United States Patent Office 3,328,329
Patented June 27, 1967

3,328,329
EMULSIONS OF LACTONE PLASTICIZED POLYMERS
Harry A. Cantor, West Orange, Gerard J. Giuliano, Chatham, and Joseph A. Vona, Westfield, N.J., assignors to Celanese Corporation, a corporation of Delaware
No Drawing. Filed Dec. 7, 1964, Ser. No. 416,624
17 Claims. (Cl. 260—29.6)

This invention relates broadly to polymeric emulsions (i.e., emulsions of polymerization products) and, more particularly, to emulsions of plasticized polymers that have been plasticized with a particular additive or modifier. Still more particularly the invention is concerned with emulsions, including aqueous emulsions, of a limited class of organic polymerization products hereafter described that have been plasticized with a lactone of a limited class. The scope of the invention additionally includes dried films of the emulsion, as well as articles having adhering to a surface thereof a dried coating of the emulsion; and, also, method features.

The lactones used in practicing the present invention may be represented by the general formula I 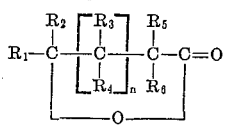

wherein $R_1$ represents a member of the group consisting of hydrogen and $C_1$ through $C_{10}$ alkyl radicals, $R_2$, $R_3$, $R_4$, $R_5$ and $R_6$ each represents a member of the group consisting of hydrogen and $C_1$ through $C_3$ alkyl radicals, and $n$ represents an integer selected from the following: 0, 1. When each of the R's in Formula I represents hydrogen and $n$ represents 0 (that is, the portion within the brackets is not included in the formula), then the compound is beta-propiolactone, the formula for which is II 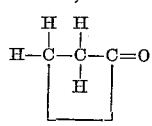

Illustrative examples of radicals represented by R in Formula I are methyl, ethyl, n-propyl, isopropyl and butyl through decyl radicals (both normal and isomeric forms). The remaining R's may be hydrogen, or a methyl, ethyl, propyl or isopropyl radical, and they may be the same or different.

More specific examples of lactones embraced by Formula I that may be used in practicing the present invention are:

alpha-methyl-beta-propiolactone
beta-methyl-beta-propiolactone
beta-propyl-beta-propiolactone (beta-n-propyl-beta-propiolactone)
beta,beta-diethyl-beta-propiolactone
alpha,alpha-dimethyl-beta-propiolactone
alpha,alpha-diethyl-beta-propiolactone
alpha-propyl-beta,beta-dimethyl-beta-propiolactone
alpha,beta-dimethyl-beta-propiolactone
gamma-propylbutyrolactone
gamma-amylbutyrolactone
alpha-ethylbutyrolactone
gamma-methylbutyrolactone
alpha,alpha-dimethylbutyrolactone
beta,beta-diethylbutyrolactone
beta,gamma-dimethylbutyrolactone
alpha-ethyl-gamma-methylbutyrolactone
alpha-gamma,gamma-trimethylbutyrolactone
gamma-decylbutyrolactone
alpha-isopropyl-gamma-methylbutyrolactone
gamma-isobutylbutyrolactone
gamma-isopropylbutyrolactone Other examples will be apparent to those skilled in the art from the foregoing illustrative examples, from the definitions of the various R's and of $n$ in Formula I, and from the illustrative examples of radicals represented by the aforementioned R's.

The polymerization products which are plasticized with a lactone of the kind embraced by Formula I in practicing the present invention are selected from the group consisting of A. homopolymers of lower aliphatic esters, having terminal ethylenic unsaturation, of lower saturated aliphatic monocarboxylic acids;
B. copolymers of mixtures of the lower aliphatic esters defined under A;
C. copolymers of, by weight (a) at least 60% of at least one lower aliphatic ester, having terminal ethylenic unsaturation, of a lower saturated aliphatic monocarboxylic acid, and (b) up to 40% of at least one different monoethylenically unsaturated organic compound which is copolymerizable with the ester of (a);
D. homopolymers of $C_1$-$C_8$ alkyl esters of alpha,beta-ethylenically unsaturated lower aliphatic monocarboxylic acids;
E. copolymers of mixtures of the $C_1$-$C_8$ alkyl esters defined under D; and
F. copolymers of, by weight, (a) at least 60% of at least one $C_1$-$C_8$ alkyl ester of an alpha,beta-ethylenically unsaturated lower aliphatic monocarboxylic acid, and (b) up to 40% of at least one different monoethylenically unsaturated organic compound which is copolymerizable with the ester of (a).

It was suggested prior to the present invention (see, for example, U.S. Patent No. 2,768,148, dated October 23, 1956) that beta-propiolactone and other lactones containing from 3 to 6 carbon atoms in the ring be used as a solvent in which acrylonitrile is polymerized alone or admixed with other unsaturated compounds that are copolymerizable with acrylonitrile, thereby to obtain a solution that may be employed directly for spinning textile materials. It has also been suggested in various prior patents that a lactone such as gamma-butyrolactone and gamma-valerolactone be used as a solvent for acrylonitrile polymers (including graft copolymers) to make a spinning solution. The lactone may be used alone in such applications; or as disclosed in U.S. Patent No. 2,721,112, dated October 18, 1955, in the form of an admixture with formic acid. Also, lactones broadly have been suggested, together with many other compounds, as plasticizers for acrylonitrile polymers (see U. S. Patent No. 2,699,433, dated January 11, 1955); and hydrocarbon-substituted butyrolactones, as plasticizing and softening agents for synthetic rubbers prepared by the polymerization of butadiene-1,3 hydrocarbons, either alone or in admixture with other polymerizable materials (see U.S. Patent No. 2,535,-664, dated Dec. 26, 1950).

The present invention is based on our discovery that dried films having improved properties such as increased clarity, better flexibility and better gloss characteristics are obtained when a lactone of the kind embraced by Formula I, preferably beta-propiolactone, is incorporated into an emulsion containing at least one polymerization product, including a plurality of polymerization products (e.g., 2, 3, 4 or 5 such products), of the group hereinbefore set forth under Items A through F. Such polymerization products, for purpose of brevity, are hereafter sometimes designated generically as "A–F" polymer or polymers.

The aforementioned marked improvement in film properties was entirely unobvious and unexpected, since such a teaching or suggestion is lacking in the prior art. In fact, the prior art is completely silent with respect to the use of lactones generally, or beta-propiolactone specifically, in modifying (e.g., plasticizing) A–F polymers in the form of aqueous or other emulsions to improve their film properties, specifically gloss, clarity and flexibility; or, for any other purpose. This is not surprising since those skilled in the art are well aware that compatibility between two different organic substances cannot, in general, be predicted; and that compatibility is essential to effective plasticization.

Another unobvious result flowing from this invention resides in the improvement in film properties that is obtained when a lactone within the scope of Formula I, specifically beta-propiolactone, is incorporated into an A–F polymer emulsion wherein a particular protective colloid is employed, namely, a hydroxylated organic compound of relatively high molecular weight and, more particularly, polyvinyl alcohol. The addition of, for example, beta-propiolactone to an A–F polymer emulsion containing polyvinyl alcohol as a protective colloid unobviously provides a dried film of greater clarity than when the lactone is omitted from the formulation.

The emulsions of the invention comprise a plasticized or modified polymerization product comprised of at least 75%, usually at least about 80% by weight of an A–F polymer, and up to about 25%, usually up to about 20%, by weight of a lactone of the kind embraced by Formula I. Preferably the A–F polymer constitutes, by weight, from about 85 to 99%, more preferably from about 90 to 98%, and the lactone from, by weight, about 1 to 15%, more preferably from about 2 to 10%, of the plasticized polymerization product. Good results have been obtained when the plasticized or modified polymerization product was constituted of, by weight, about 95% of A–F polymer and about 5% of lactone, specifically beta-propiolactone.

Illustrative examples of lower aliphatic esters, having terminal ethylenic unsaturation, of lower saturated aliphatic monocarboxylic acids that may be used in practicing the present invention are vinyl acetate, propionate, butyrate, isobutyrate and caproate; and the corresponding allyl and methallyl esters, especially when a small amount thereof is used in conjunction with a larger amount of a vinyl ester such as, for example, vinyl acetate. Mixtures of vinyl esters may be employed, e.g., mixtures of vinyl acetate with vinyl formate or with vinyl esters of a lower saturated aliphatic monocarboxylic acid higher than acetic in the homologous series.

Illustrative examples of $C_1$–$C_8$ alkyl esters of alpha, beta-ethylenically unsaturated lower aliphatic monocarboxylic acids that may be employed in carrying the instant invention into effect are the methyl, ethyl and propyl through octyl (both normal and isomeric forms) esters of acrylic acid and of alpha-methyl through alpha-pentyl-substituted acrylic acids. As in the case of making the copolymers of B by polymerizing mixtures of the lower aliphatic esters defined under A, so too one may produce and use in this invention copolymers of mixtures of the aforementioned $C_1$–$C_8$ alkyl esters in any proportions.

The copolymer component (b) of the copolymers of C may be, for example, one or more $C_1$–$C_8$ alkyl esters of an alpha-beta-ethylenically unsaturated lower aliphatic monocarboxylic acid, numerous examples of which have been given hereinbefore. Similarly, the copolymer component (b) of the copolymers of F may be, for instance, one or more lower aliphatic esters, having terminal ethylenic unsaturation, of lower saturated aliphatic monocarboxylic acids.

Illustrative examples of other "different monoethylenically unsaturated organic" compounds that may constitute all or part of the component (b) in making the copolymers of C and F are the monoethylenically unsaturated mono- and polycarboxylic acids, the anhydrides (i.e., available anhydrides) of said acids, and the substituted and N-substituted amides of said acids. More specific examples of these classes of comonomers are: acrylic acid and the alkyl-substituted, especially the $C_1$–$C_8$ alkyl-substituted, acrylic acids; crotonic acid; alpha-methyl-isocrotonic acid (angelic acid); alpha,beta-dimethylacrylic acid (tiglic acid); atropic acid; cinnamic acid; 2-hexenoic acid; 2,4-pentadienoic acid; itaconic, fumaric, maleic, citraconic, mesaconic and aconitic acids and the halogeno- (e.g. chloro-, bromo- and fluoro-) substituted derivatives of the said acids; maleic anhydride; citraconic anhydride; the unsubstituted amides of the aforementioned mono- and polycarboxylic acids; and the N- (mono-, di- and tri-) substituted amides obtained by reacting the aforementioned mono- and polycarboxylic acids with an aldehyde, e.g., formaldehyde and higher members of the homologous series thereby to obtain for example N-mono- and dimethylol-substituted amides, e.g., N-mono- and dimethylolacrylamides, -methacrylamides, etc.

Other examples of monomers that may be used as all or part of the component (b) in making the C and F copolymers are mono- and polyalkyl esters of ethylenically unsaturated polycarboxylic acids (including alpha,beta-ethylenically unsaturated polycarboxylic acids), examples of which acids are maleic, fumaric, itaconic, citraconic, mesaconic and aconitic acils. Each or all of the alkyl groupings of such esters may contain from 1 to 16 carbon atoms, but preferably contain from 1 through 8 carbon atoms (i.e., $C_1$–$C_8$ alkyl esters). More specific examples of such esters are diethyl, dibutyl and dioctyl maleates and fumarates.

Other examples of comonomers that may be used as the (b) component in making the copolymers of C and F are styrene, methylstyrene, vinyltoluene, isopropenyltoluene, and other monoethylenically unsaturated hydrocarbons; unsaturated ethers such as methyl vinyl ether; unsaturated ketones such as methyl vinyl ketone, ethyl vinyl ketone, methyl isopropenyl ketone; unsaturated sulfones such as vinyl sulfone; and the like.

In making the copolymers of C and F the (a) component preferably comprises, by weight of the mixture of copolymerizable materials from which the copolymer is made, from about 65 to 99.5% or more (but less than 100%), more particularly from about 70 to about 95%, e.g., about 75 or 80%, while the (b) component constitutes the remainder, viz., preferably about 0.5% to about 35%, more particularly from about 5 to about 30%, e.g., about 20 or 25%.

The polymerization reaction is conveniently carried out in the presence of a polymerization catalyst, e.g., a peroxide catalyst or any other free-radical catalyst or catalyst system, with or without other catalytic influences. The chosen catalyst should function effectively at the reaction temperature employed and, in an aqueous system, should be at least partly soluble in water and/or in the monomeric mixture. Preferably there is used a catalyst such as a peroxide that is at least partly soluble in water. More specific examples of peroxide catalysts that may be employed are hydrogen peroxide, water-soluble inorganic per-salts such as the persulfates, perphosphates, perborates, etc., and ammonium persulfates, perphosphates, perborates, etc. Organic peroxides having at least some solubility in water or in the reaction mass are also useful, e.g., acetyl peroxide, benzoyl peroxide, tertiary-butyl hydroperoxide and others of similar characteristics. Illustrative examples of redox-catalyst systems that may be employed are such combinations as mixtures of hydrogen peroxide and an iron salt; hydrogen peroxide and zinc formaldehyde sulfoxylate or similar reducing agent; hydrogen peroxide and a titanous salt; and alkali-methal persulfate, e.g., potassium persulfate, and an alkali-metal bisulfite, e.g., sodium bisulfite; a bromate such as potassium bromate in combination with a bisulfite such as potassium bisulfite; and others known in the art.

The amount of polymerization catalyst employed may be widely varied, e.g., from about 0.5% to about 5%, more particularly from about 1% to about 2%, by weight of the polymerizable material (i.e., a single or a plurality of polymerizable materials). Obviously no more catalyst should be used than is required to obtain maximum conversion at lowest catalyst cost.

The term "emulsion" as used herein and in the appended claims is intended to include or mean a true dispersion of the particles of polymer (homopolymer or copolymer) in water, a colloidal dispersion of the polymer in water, a colloidal dispersion of the polymer particles in water in which the particles of the polymer are in the colloidal size range; or true solutions of the polymer in aqueous solutions of an alkali, e.g., NaOH, since the polymer may be present in water under alkaline conditions in any one or more of the above forms.

In forming the emulsion or dispersion there is used a dispersing agent, more particularly a "water-soluble" (within which term is included "water-miscible") surfactant, which also may be designated as an emulsifier or as a surface-tension depressant. Examples of suitable surfactants are the known anionic and non-ionic wetting agents. Preferably an anionic or non-ionic surfactant is employed.

Examples of anionic agents that may be used include the higher-molecular-weight sulfonic acids and salts thereof, e.g., alkyl aryl sulfonates such as isobutyl, di-isobutyl and amyl naphthalene sulfonic acids and salts thereof, and higher members of the homologous series including those containing from 6 to 20 or more carbon atoms in the alkyl substituent or substituents. Examples of salts of the aforementioned acids that are useful as anionic agents are their alkali-metal, specifically sodium, salts; sodium lauryl sulfate; sodium salt of dioctyl sulfosuccinate; and formaldehyde-naphthalene sulfonic acid condensation products.

Illustrative examples of non-ionic surfactants that may be employed include polyethoxyethanol derivatives of methylene-linked alkylphenols; sulfur-containing agents such as those made by condensing the required proportion of ethylene oxide with nonyl, dodecyl, tetradecyl, etc., mercaptans or with alkylthiophenols having alkyl groups of from 6 to 15 carbon atoms; ethylene oxide derivatives of long-chain carboxylic acids such as lauric, myristic, palmitic, oleic, etc., or mixtures of acids such as those present in tall oil; ethylene oxide condensates of long-chain alcohols such as octyl, decyl, lauryl or cetyl alcohols; and ethylene oxide derivatives of etherified or esterified polyhydroxy compounds having a hydrophobic hydrocarbon chain. The preferred non-ionic surfactant is a relatively long-chain alkylphenoxy(polyethoxy)ethanol, more particularly those having attached to the aromatic nucleus an alkyl group containing from 7 through 12 carbon atoms. Mixtures of such alkylphenoxy (polyethoxy) ethanols with each other or with other surfactants including non-ionic surfactants in any proportions may be used as desired or as conditions may require.

The surfactant aids in effecting emulsification of the monomers, in sustaining the polymerization reaction and in stabilizing the resulting colloidal dispersion.

The amount of surfactant employed may be varied considerably, but ordinarily it is used in an amount corresponding to from about 2% to about 12%, more particularly from 4 to 10%, by weight, based on the total weight of the polymerizable ingredient or ingredients.

The emulsion also preferably contains a small amount of a protective colloid. Illustrative examples of useful protective colloids are water-soluble methyl cellulose, hydroxyethyl cellulose, carboxymethyl cellulose and hydroxyethyl ethers of cellulose. Advantageously the protective colloid is a polyvinyl alcohol including those containing acetate groups (e.g., up to about 10% acetate groups). Examples of other protective colloids that may be used are polyacrylamide, polyvinylpyrrolidone, gum arabic, gum tragacanth, soluble starch, glue, gelatin, water-soluble alginates, e.g., sodium alginate, casein, agar, and the like. The amount of the protective colloid may range, for example, from about 0.1% to about 2%, and more particularly from about 0.5% to about 1%, by weight of the total monomer or monomers charged.

Broadly described, the polymers that are plasticized (internally and/or externally plasticized) with a lactone in accordance with this invention are prepared by polymerizing, with the aid of a polymerization catalyst and at a temperature within the range of from about 40° C. to about 90° C., polymerizable material of the kind and in the weight proportions hereinbefore set forth. Emulsions, specifically aqueous emulsions, of the polymers are formed by dispersing the polymerizable material of which the polymer is formed in water. The dispersing agent is a water-soluble surfactant, more particularly a water-soluble anionic or non-ionic surfactant, and preferably a non-ionic surfactant such as a relatively long-chain alkylphenoxy(polyethoxy)ethanol. The dispersion is effected in the presence of a suitable amount of the dispersing agent, e.g., from about 2% to about 12% by weight, based on the total weight of the polymerizable material. A polymerization catalyst or catalyst system is added to the reaction mixture initially and/or during the course of the reaction, and the catalyzed reaction mass is heated within the aforementioned 40°–90° C. temperature range.

Preferably polymerization is effected by heating the dispersion of monomeric material below about 80° C., more particularly at from 45° C. to 75° C. If temperatures much above about 80° C. (e.g., up to about 90° C.) are employed, it is usually for a relatively short period of time (so-called "finishing time"), e.g., up to about 20 or 25% of the total period of reaction. Such a "finishing" time assures maximum conversion of the dispersed monomeric material to polymeric material.

The emulsions may be prepared continuously, semi-continuously or by batch technique. For example, the polymerizable ingredient or mixture of copolymerizable ingredients may be added to the aqueous medium containing the dispersing agent at a rate such that throughout most, if not substantially all, of the polymerization reaction the concentration of the aforesaid ingredient or ingredients is relatively low, e.g., not more than about 20 parts, preferably not above about 5 parts, of polymerizable material per 100 parts of water, said parts being by weight. Preferably the polymerizable material (e.g., monomer or mixture of monomers) is added at a rate that approximates the rate of polymerization thereof in the aqueous medium. The polymerizable material is added until the concentration of polymer (homopolymer or copolymer) in the aqueous medium has increased to the desired value, preferably until the polymer content of the resulting emulsion is from about 40 to 65 weight percent and, in a still more preferred range, from about 45 to 58 weight percent.

The polymerization is preferably carried out within a pH range of from about 3 to about 8, and preferably at a pH of from 4 to 7. The emulsion is preferably adjusted to a pH of from 6.5 to 7.5 if it is not already within this pH range at the end of the reaction period. The pH may be controlled or adjusted by the use of acids or bases such as formic acid, sodium bicarbonate, sodium acetate, sodium phosphate, sodium hydroxide, ammonium hydroxide, etc.

Advantageously, the reaction is effected in a substantially oxygen-free atmosphere by operating in a closed reactor which has been purged with nitrogen or other inert gas to render it substantially free of oxygen. If desired, the reaction may be carried out in an atmosphere of an inert gas, e.g., by passing a stream of nitrogen, carbon dioxide or other inert gas through the reaction mass throughout the course of the reaction.

The time of the reaction will vary widely depending upon, for example, the particular equipment and technique employed (e.g., continuous, semi-continuous or batch equipment), size of the total charge, particular polymerizable material and other additive or additives employed, and other influencing factors. For instance, the reaction time may vary, for example, from 1 to 10 hours or more.

A lactone of the kind embraced by Formula I may be introduced into the reaction mass either before, during or after the polymerization of the polymerizable material or mixture of polymerizable materials. The lactone is added in an amount corresponding to up to about 25% by weight of the total amount of polymerizable (or polymerized) material and lactone. For example, the lactone may be added to the aqueous emulsion of polymer while agitating and heating the admixture at a temperature of from about 45° C. to about 95° C. for a period of time sufficient to improve the film-forming properties of the polymer, e.g., from 5 minutes to 1 hour or more.

The lactone may react with the polymerized material or coreact with the polymerizable or mixture of copolymerizable materials to yield an internally plasticized polymer or copolymer. For example, a small amount of beta-propiolactone is added to an emulsion of a copolymer of butyl acrylate and acrylamide at the end of the copolymerization reaction. This is done in order to react the beta-propiolactone with the amide group of the copolymer. The reaction may result in, for example, either an addition product or a grafted polyester chain. A film of this beta-propiolactone-modified polymer emulsion is cast on glass plates versus a sample of the lactone-unmodified polymer emulsion. Upon examination it is found that the film of the beta-propiolactone-modified polymer emulsion is softer, possesses extensibility but exhibits little or no tack as compared with that obtained from the unmodified polymer emulsion. The film of the lactone-modified copolymer is removed easily from a glass plate upon which it was cast and then dried, whereas a similar film of the unmodified copolymer is very tacky although it has good elongation and adheres very tenaciously to a glass plate upon which it has been cast. The fact that the beta-propiolactone effectively plasticized the copolymer film was quite unexpected and in no way could have been predicted.

In order that those skilled in the art may better understand how the instant invention may be carried into effect, the following examples are given by way of illustration and not by way of limitation. All parts and percentages are by weight unless otherwise stated:

*Example 1*

Four hundred and sixty-four (464) grams of water is accurately weighed, and a 50-gram aliquot is used to dissolve 1.25 grams (50%) of a polymerization catalyst, specifically potassium persulfate, while another 50-gram aliquot is employed to dissolve the remaining 1.25 grams of catalyst. One portion of the dissolved catalyst is used initially while the other is employed later as a delayed addition. Another 100-gram aliquot of water is used to dissolve 0.3 gram of a non-ionic hydrophylic protective colloid, specifically Cellosize WP-09. Chemically it is a hydroxyethylether of cellulose. When the Cellosize WP-09 has completely dissolved, the resulting solution is charged, with the remaining unused water, to a reaction vessel provided with a reflux condenser and agitating means.

The reaction vessel is then charged with 36 grams Igepal CO-977 (a 70% aqueous solution of Igepal CO-970), 6.5 grams Igepal CO-630 and 4.3 grams of Tergitol NP-14. These additives are non-ionic emulsifiers. Chemically, they are nonylphenoxy(polyethoxy) ethanol having varying amounts of ethylene oxide combined therein. Thus, based on the weight of nonylphenol employed in their preparation, Igepal CO-930 has an average of about 97% combined ethylene oxide therein; Igepal CO-630 has an average of about 63% combined ethylene oxide therein; and Tergitol NP-914 has an average of about 43% ethylene oxide combined therein.

Under agitation, the aforementioned nonylphenoxy (polyethoxy) ethanols are dissolved, after which about 1 gram of Nopco NDW (a defoaming agent produced and sold by Nopco Chemical Company, Newark, N.J.) and 1.0 gram of sodium bicarbonate (as a buffering agent) are added to the reaction vessel.

To the aqueous phase resulting from the above additions is added 10% of the total weight of monomers to be added, i.e., 41.46 grams vinyl acetate, 9.95 grams ethyl acrylate and 3.87 grams dioctyl maleate, specifically di-2-ethylhexyl maleate. After thorough mixing of the reaction mass, the initial aqueous solution of dissolved catalyst is charged, and the vessel is heated slowly until the agitated mass reaches a temperature of 80° C. This requires about ½ hour.

When the reaction temperature reaches 80° C., the premixed delayed monomer addition (equivalent to 90% of the total charge of monomers) and the delayed catalyst addition (50% of the total catalyst charge) are added incrementally over a 2-hour period while maintaining the reaction temperature at 80° C. by means of a hot water bath. After the addition of the delayed charge of monomers and catalyst, the reaction temperature is increased to 90° C. and maintained at this temperature for one-half hour to assure a good conversion yield.

At the end of the reaction period there is added slowly, with agitation, 27.6 grams (approximately 5% of the total amount of monomers charged) of a lactone of the kind embraced by Formula I, specifically beta-propiolactone, over a period of 15 minutes. Agitation is continued for an additional 30 minutes while the emulsion is cooling from about 70° C. to about 45° C.

A sample of the emulsion of the beta-propiolactone-plasticized vinyl acetate copolymer is cast upon a glass plate, and oven-dried at 105° C., together with a sample of the emulsion of the unplasticized vinyl acetate copolymer. The lactone-plasticized vinyl acetate copolymer yields a film having greater clarity, better gloss and which is more flexible than the film of the similarly prepared, unplasticized vinyl acetate copolymer.

*Example 2*

Same as in Example 1 with the exception that instead of beta-propiolactone there is used 33.1 grams of gamma-butyrolactone. Similar results are obtained.

*Example 3*

Same as in Example 1 with the exception that an equivalent molar amount of vinyl propionate is used instead of 414.6 grams of vinyl acetate. Substantially the same improvement in the properties of the resulting film are obtained as described under Example 1 with reference to the film of that example.

*Example 4*

Same as Example 1 with the exception that the copolymer is a binary copolymer of vinyl acetate and ethyl acrylate instead of a ternary polymer of vinyl acetate, ethyl acrylate and di-2-ethylhexyl maleate, which latter (a total of 38.7 grams) is omitted from the formulation; and the amount of beta-propiolactone is increased from 27.6 grams to 41.4 grams. Similar results are obtained.

*Example 5*

An emulsion of homopolymeric vinyl acetate containing free —OH groups, which is commercially available from E. I. du Pont de Nemours & Company, Wilmington, Del., under the name of Elvacet 81-900 is heated to about 80°–85° C., after which 5% by weight of beta-propiolactone, based on the weight of the homopolymeric solids in the said emulsion, is added thereto. The mixture is agitated for 30 minutes while maintaining the temperature at 80°–85° C.

The plasticized and unplasticized polymer emulsions are cast on glass plates and air-dried. The emulsion of the lactone-modified polymer yields an air-dried film that is clear, softer and that has greater elongation than that of the film obtained from the dried emulsion of the unmodified homopolymeric vinyl acetate. These differences in properties indicate that the beta-propiolactone has plasticized the polymer.

Similar results are obtained when the polymeric emulsion is cast on other substrates, e.g., wood, steel, copper and copper alloys, aluminum and aluminum alloys, and other metals; also, ceramics such as tile, stone, concrete, etc.

It cannot be stated with certainty whether or not the lactone has formed a polymeric polyester by reaction of the beta-propiolactone monomer; or whether or not it has reacted with available hydroxyl groups in the polyvinyl acetate to yield an internally plasticized polymer. The latter reaction is a strong possibility as indicated by the fact that the lactone-modified product has improved water resistance, in addition to better gloss and clarity, as compared with the film obtained from the unmodified homopolymeric vinyl acetate.

*Example 6*

Same as in Example 5 with the exception that the polymer is homopolymeric vinyl acetate which is substantially free from hydroxyl groups and the emulsion contains about 0.5%, by weight of the aforesaid homopolymer, of polyvinyl alcohol as a protective colloid. A film of greater clarity is obtained as compared with those from polyvinyl alcohol-containing emulsions to which beta-propiolactone has not been added. The film also has good gloss characteristics.

*Example 7*

Same as in Example 6 with the exception that the polymer is a copolymer of about 80% by weight of vinyl acetate and about 20% by weight of vinyl propionate. Similar results are obtained.

*Example 8*

This example illustrates the preparation of an emulsion obtained by emulsion polymerization of a mixture of monomers consisting of 97.5% butyl acrylate and 2.5% acrylamide, and into which has been incorporated, by adding to the emulsion toward the end of the reaction, 6.25% of beta-propiolactone based on the total weight of the aforesaid monomers.

|  | Grams |
|---|---|
| Butyl acrylate | 390.0 |
| Acrylamide | 10.0 |
| Water | 560.0 |
| Triton® X–200 (a surfactant, which is available from Rohm and Haas Company, Philadelphia, Pa.) | 35.7 |
| Sodium metabisulfite | 0.5 |
| Ammonium persulfate | 0.5 |
| Beta-propiolactone | 25.0 |
|  | 1021.7 |

The acrylamide is dissolved in 50 g. of water, the sodium meta-bisulfite in 50 g. of water and the ammonium persulfate in another 50 g. of water. The water used in preparing these three solutions constitutes part of the 560 g. of water given in the above formulation. The remaining 410 g. of water and the Triton X–200 surfactant are charged to a reaction vessel provided with a stirrer, and nitrogen-inlet and reactant-charge openings. The mixture is sparged for 20 minutes with nitrogen while stirring at 450 r.p.m. at room temperature.

Fifteen (15) percent of the butyl acrylate and 15 percent of the aqueous solution of acrylamide are added to the reaction mixture, and sparging and stirring are continued for another 15 minutes. Next, half of the aqueous solution of sodium metabisulfite and half of the aqueous solution of ammonium persulfate are added to the reaction mixture. In about 5 minutes, the reaction temperature rises and the mixture becomes a translucent blue in color.

When the reaction temperature reaches 35°–40° C., there is added incrementally the remainder of the butyl acrylate, aqueous solution of acrylamide, aqueous solution of sodium metabisulfite and aqueous solution of ammonium persulfate, all in separate streams. The delayed monomer and catalyst additions are carried out over a period of about 2 hours, during which time the reaction temperature is maintained at 60°–65° C.

Upon completion of the delayed additions the beta-propiolactone (25 g.) is added while continuing the stirring and the reaction mass is heated to 90° C. by means of a hot-water bath for ½ hour. The resulting emulsion of beta-propiolactone plasticized copolymer of butyl acrylate and acrylamide is cooled to room temperature (20°–30° C.), and then adjusted to a pH of about 7.0 with a 28% aqueous solution of ammonium hydroxide.

Emulsions of the lactone-modified copolymer and of the same copolymer prepared in a like manner, but in the absence of beta-propiolactone, are cast on glass, and the films are air-dried for about 16 hours at room temperature. A substantial difference in the drying times of the two emulsions is noted. The lactone-modified emulsion dries at a much faster rate than the unmodified emulsion. Examination of the lactone-modified polymeric film shows that it is softer than the unmodified polymeric film, and that it possesses extendability but exhibits little or no tack. In marked contrast the unmodified copolymer is very tacky.

The emulsions of the foregoing examples and others embraced by this invention are useful as components of textile-finishing compositions, in paint and other decorative and protective-coating compositions, and in impregnating, laminating, adhesive, sealing and other compositions that will be apparent to those skilled in the art from the foregoing illustrative examples.

It is to be understood that the foregoing detailed description is given merely by way of illustration and not by way of limitation, and that many variations may be made therein without departing from the spirit of the invention.

We claim:
1. An emulsion comprising a plasticized polymerization product comprised of
   I. at least 75% by weight of at least one polymerization product selected from the group consisting of
      A. homopolymers of lower aliphatic esters, having terminal ethylenic unsaturation, of lower saturated aliphatic monocarboxylic acids;
      B. copolymers of mixtures of the lower aliphatic esters defined under A;
      C. copolymers of, by weight, (a) at least 60% of at least one lower aliphatic ester, having terminal ethylenic unsaturation, of a lower saturated aliphatic monocarboxylic acid, and (b) up to 40% of at least one different monoethylenically unsaturated organic compound which is copolymerizable with the ester of (a);
      D. homopolymers of $C_1$–$C_8$ alkyl esters of alpha,beta-ethylenically unsaturated lower aliphatic monocarboxylic acids;
      E. copolymers of mixtures of the $C_1$–$C_8$ alkyl esters defined under D; and
      F. copolymers of, by weight, (a) at least 60% of at least one $C_1$–$C_8$ alkyl ester of an alpha,beta-ethylenically unsaturated lower aliphatic monocarboxylic acid, and (b) up to 40% of at least one different monoethylenically unsaturated organic compound which is copolymerizable with the ester of (a); and II. a plasticizing amount, up to about 25% by weight of the plasticized polymerization product, of a lactone represented by the general formula

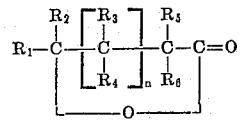

wherein $R_1$ represents a member of the group consisting of hydrogen and $C_1$ through $C_{10}$ alkyl radicals, $R_2$, $R_3$, $R_4$, $R_5$ and $R_6$ each represents a member of the group consisting of hydrogen and $C_1$ through $C_3$ alkyl radicals, and $n$ represents an integer selected from the following 0, 1.

2. An emulsion as in claim 1 which additionally contains from about 0.1% to about 2%, by weight thereof, of a protective colloid.

3. An emulsion as in claim 2 wherein the protective colloid is polyvinyl alcohol.

4. An emulsion as in claim 1 wherein the polymerization product of I comprises a homopolymer of a lower aliphatic ester, having terminal ethylenic unsaturation, of a lower saturated aliphatic monocarboxylic acid.

5. An emulsion as in claim 4 wherein the homopolymer is polyvinyl acetate.

6. An emulsion as in claim 1 wherein the polymerization product of I comprises a copolymer of, by weight, (a) at least 60% of at least one lower aliphatic ester, having terminal ethylenic unsaturation, of a lower saturated aliphatic monocarboxylic acid, and (b) up to 40% of at least one different monoethylenically unsaturated organic compound which is copolymerizable with the ester of (a).

7. An emulsion as in claim 6 wherein the lower aliphatic ester of (a) is vinyl acetate.

8. An emulsion as in claim 1 wherein the polymerization product of I comprises a copolymer of, by weight, at least 60% of at least one $C_1$–$C_8$ alkyl ester of an alpha,beta-ethylenically unsaturated lower aliphatic monocarboxylic acid, and (b) up to 40% of at least one different monoethylenically unsaturated organic compound which is copolymerizable with the ester of (a).

9. An emulsion as in claim 8 wherein the $C_1$–$C_8$ alkyl ester of (a) is butyl acrylate.

10. An emulsion as in claim 8 wherein the $C_1$–$C_8$ alkyl ester of (a) is butyl acrylate and the different monoethylenically unsaturated organic compound of (b) is acrylamide.

11. An emulsion as in claim 1 wherein the lactone of II is beta-propiolactone.

12. A film-forming emulsion comprising a plasticized polymerization product comprised of, by weight, at least 80% polyvinyl acetate and a plasticizing amount, up to 20%, of beta-propiolactone.

13. A film-forming emulsion comprising a plasticized polymerization product comprised of
I. at least 80% by weight of a copolymer of, by weight;
   (a) at least 60% of butyl acrylate and
   (b) up to 40% of acrylamide; and
II. a plasticizing amount, up to 20% by weight, of beta-propiolactone.

14. A dried film comprised of the emulsion of claim 3.

15. An article having adhering to a surface thereof a dried coating comprised of the emulsion of claim 3.

16. The method of improving the film-forming properties of the polymerization product defined under I of claim 1 which comprises adding to an aqueous emulsion of the said polymerization product a lactone of the kind defined under II of claim 1; and agitating and heating the resulting admixture at a temperature of from about 45° C. to about 95° C. for a period of time sufficient to improve the film-forming properties of the said polymerization product.

17. The method as in claim 16 wherein the lactone is beta-propiolactone.

References Cited
UNITED STATES PATENTS

| | | | |
|---|---|---|---|
| 2,768,148 | 10/1956 | Schildknecht et al. | 260—30.4 |
| 2,795,564 | 6/1957 | Conn et al. | 260—29.6 |
| 2,913,430 | 11/1959 | Roeser | 260—30.4 |
| 3,010,929 | 11/1961 | Jones | 260—29.6 |
| 3,053,819 | 9/1962 | Carlin | 260—86.1 |

SAMUEL H. BLECH, *Primary Examiner.*

MURRAY TILLMAN, *Examiner.*

J. ZIEGLER, *Assistant Examiner.*